United States Patent
Yamazaki (10) Patent No.: US 9,394,965 B2
(45) Date of Patent: Jul. 19, 2016

(54) ABSORBER SYSTEM FOR VEHICLE

(71) Applicant: TOYOTA JIDOSHA KABUSHIKI KAISHA, Toyota-shi, Aichi-ken (JP)

(72) Inventor: Ippei Yamazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/703,310

(22) Filed: May 4, 2015

(65) Prior Publication Data
US 2015/0345587 A1 Dec. 3, 2015

(30) Foreign Application Priority Data
May 27, 2014 (JP) ................................. 2014-109118

(51) Int. Cl.
| | | |
|---|---|---|
| B60G 17/018 | (2006.01) |
| B60G 23/00 | (2006.01) |
| B62K 25/00 | (2006.01) |
| F16F 15/00 | (2006.01) |
| F16F 9/512 | (2006.01) |

(52) U.S. Cl.
CPC ............... *F16F 15/002* (2013.01); *F16F 9/512* (2013.01)

(58) Field of Classification Search
CPC ................................ F16F 15/002; F16F 9/512
See application file for complete search history.

(56) References Cited

U.S. PATENT DOCUMENTS

| | | | |
|---|---|---|---|
| 5,983,150 A * | 11/1999 | Sasaki ................ | B60G 17/0165 701/38 |
| 6,092,011 A * | 7/2000 | Hiramoto ................ | F16F 9/466 280/5.5 |
| 6,314,353 B1 | 11/2001 | Ohsaku et al. | |
| 6,502,837 B1 * | 1/2003 | Hamilton ........... | B60G 17/0152 280/5.515 |
| 6,701,235 B2 | 3/2004 | Uchiyama et al. | |
| 7,617,032 B2 | 11/2009 | Izawa et al. | |
| 8,398,091 B2 | 3/2013 | Inoue et al. | |

(Continued)

FOREIGN PATENT DOCUMENTS

| | | |
|---|---|---|
| JP | H05-104927 A | 4/1993 |
| JP | H05-178044 A | 7/1993 |

(Continued)

OTHER PUBLICATIONS

U.S. Appl. No. 14/717,600, filed May 20, 2015 in the name of Yamazaki.

(Continued)

*Primary Examiner* — Mary Cheung
(74) *Attorney, Agent, or Firm* — Oliff PLC (57) ABSTRACT

An absorber system for a vehicle includes a controller. The controller determines a reference control amount as a reference of a target control amount which is a target of a control amount for controlling a damping force with respect to an operation of a cylinder in its extension and an operation of the cylinder in its compression. The controller determines the target control amount to the reference control amount for one of the operation of the cylinder in its extension and the operation of the cylinder in its compression and determines the target control amount to a value obtained by multiplying the reference control amount by an extension-compression gain for the other. The controller changes the extension-compression gain in at least one of a driving-stability-emphasized situation in which driving stability is to be emphasized and a ride-comfort-emphasized situation in which ride comfort is to be emphasized.

13 Claims, 8 Drawing Sheets

(56) References Cited

U.S. PATENT DOCUMENTS

| | | |
|---|---|---|
| 8,668,060 B2 | 3/2014 | Kondo et al. |
| 9,061,562 B2 | 6/2015 | Hayakawa |
| 2005/0178628 A1 | 8/2005 | Uchino et al. |
| 2008/0004770 A1 | 1/2008 | Masamura |
| 2008/0004771 A1 | 1/2008 | Masamura |
| 2010/0200343 A1 | 8/2010 | Kondo et al. |
| 2012/0247888 A1* | 10/2012 | Chikuma ............... B60G 17/08 188/266.1 |
| 2012/0305347 A1* | 12/2012 | Mori ...................... B60G 17/08 188/266.2 |
| 2012/0305348 A1 | 12/2012 | Katayama et al. |
| 2014/0005024 A1 | 1/2014 | Reiff et al. |
| 2014/0005889 A1 | 1/2014 | Hayakawa |
| 2014/0095024 A1 | 4/2014 | Hirao |
| 2014/0316652 A1* | 10/2014 | Ericksen ................. F16F 9/512 701/37 |
| 2015/0345587 A1 | 12/2015 | Yamazaki |

FOREIGN PATENT DOCUMENTS

| | | |
|---|---|---|
| JP | H05-208609 A | 8/1993 |
| JP | H09-123726 A | 5/1997 |
| JP | 2007-168716 A | 7/2007 |
| JP | 2011-007322 A | 1/2011 |

OTHER PUBLICATIONS

Mar. 18, 2016 Office Action issued in U.S. Appl. No. 14/717,600.

* cited by examiner

ABSORBER SYSTEM FOR VEHICLE

CROSS REFERENCE TO RELATED APPLICATION

The present application claims priority from Japanese Patent Application No. 2014-109118, which was filed on May 27, 2014, the disclosure of which is herein incorporated by reference in its entirety.

BACKGROUND

1. Technical Field

The present invention relates to an absorber system for a vehicle (hereinafter may be referred to as "vehicle absorber system"), which generates a damping force with respect to relative movement of a sprung portion and an unsprung portion of the vehicle such that a magnitude of the damping force can be changed.

2. Description of the Related Art

Patent Document 1 discloses a shock absorber including a cylinder and a damping force generator. The cylinder includes: a housing configured to store working fluid; a piston slidably provided in the housing; and a rod having one end portion coupled to the piston and the other end portion extending from the housing. The cylinder is provided so as to connect a sprung portion and an unsprung portion of the vehicle to each other. The cylinder is extended and compressed by relative movement of the sprung portion and the unsprung portion. The damping force generator is configured to generate a damping force with respect to extension and compression of the cylinder by providing resistance to a flow of the working fluid which is caused by the extension and compression of the cylinder. The damping force generator includes a solenoid and is capable of changing a magnitude of the damping force to be generated, based on a current supplied to the solenoid.

PRIOR ART DOCUMENT

Patent Document

Patent Document 1: Japanese Patent Application Publication No. 2011-007322

SUMMARY

In general, the damping force generated by the shock absorber preferably varies between the case where the cylinder is extended and the case where the cylinder is compressed. The shock absorber disclosed in Patent Document 1 is configured such that working fluid passes through a single damping force generator in both of the extension and compression of the cylinder. Accordingly, a vehicle absorber system including the shock absorber disclosed in Patent Document 1 is desirably configured such that the damping force to be generated by the damping force generator is optimized in each of the extension and compression of the cylinder. Thus, such absorber system including the damping force generator as described above is still in a developing stage and there is still room for improvement for increasing the utility of the absorber system. This invention has been developed in view of the above-described situations, and it is an object of the present invention to provide a vehicle absorber system having high utility.

The object indicated above may be achieved according to the present invention which provides a vehicle absorber system configured to: determine a reference control amount as a reference of a target control amount which is a target of a control amount for controlling a damping force; determine the target control amount to the reference control amount for one of an operation of a cylinder in extension thereof and an operation of the cylinder in compression thereof and determine the target control amount to a value obtained by multiplying the reference control amount by an extension-compression gain, for the other of the operation of the cylinder in extension thereof and the operation of the cylinder in compression thereof; and change the extension-compression gain in at least one of a driving-stability-emphasized situation and a ride-comfort-emphasized situation.

Effects

The absorber system according to the present invention sets damping-force generation characteristics for one of the operation of the cylinder in extension thereof and the operation of the cylinder in compression thereof and merely sets the extension-compression gain for the other operation. Accordingly, when compared with a configuration in which the damping-force generation characteristics are set in advance for the other operation, the present absorber system can greatly reduce the number of man-hours in a design phase and generate an appropriate damping force in a simple and easy method according to a situation of the vehicle. These advantages achieve high utility of the absorber system according to the present invention.

Forms of the Invention

There will be described various forms of the invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and the embodiments. It is to be further understood that any form in which one or more elements is/are added to or deleted from any one of the following forms may be considered as one form of the claimable invention.

(1) An absorber system for a vehicle, comprising:

a cylinder comprising: a housing configured to store working fluid; a piston slidably provided in the housing; and a rod whose one end portion is coupled to the piston and another end portion extends from the housing, the cylinder being provided so as to connect a sprung portion and an unsprung portion of the vehicle to each other, the cylinder being extended and compressed by relative movement of the sprung portion and the unsprung portion;

a damping force generator configured to generate a damping force with respect to an operation of the cylinder in extension thereof and an operation of the cylinder in compression thereof by providing resistance to a flow of the working fluid which is caused by the extension and compression of the cylinder, the damping force generator comprising a solenoid and being capable of changing a magnitude of the damping force to be generated, based on a current supplied to the solenoid; and a controller configured to control the damping force generator to control the damping force with respect to the operation of the cylinder in extension thereof and the operation of the cylinder in compression thereof, the controller comprising:

a reference control amount determiner configured to determine a reference control amount as a reference of a target control amount which is a target of a control amount for controlling the damping force with respect to the operation of the cylinder in extension thereof and the operation of the cylinder in compression thereof, the reference control amount serving as the reference in determination of the target control amount;

a target control amount determiner configured to determine the target control amount to the reference control amount for one of the operation of the cylinder in extension thereof and the operation of the cylinder in compression thereof and determine the target control amount to a value obtained by multiplying the reference control amount by an extension-compression gain for another of the operation of the cylinder in extension thereof and the operation of the cylinder in compression thereof, the extension-compression gain being based on a ratio between a damping force to be achieved in the operation of the cylinder in extension thereof and a damping force to be achieved in the operation of the cylinder in compression thereof; and an extension-compression gain changer configured to change the extension-compression gain in at least one of a driving-stability-emphasized situation in which driving stability of the vehicle is to be emphasized and a ride-comfort-emphasized situation in which ride comfort of the vehicle is to be emphasized.

The absorber system according to this form is assumed to be configured such that the single damping force generator generates the damping force in both of the extension of and the compression of the cylinder, and the single damping force generator separately controls the damping force in the extension of the cylinder and the damping force in the compression of the cylinder.

As described above, the reference control amount in this form is the target control amount for one of the operation of the cylinder in extension thereof (hereinafter may be referred to as "rebound operation") and the operation of the cylinder in compression thereof (hereinafter may be referred to as "bound operation"). That is, it is possible to consider that the damping-force generation characteristics are set for one of the rebound operation and the bound operation of the cylinder. It is noted that the reference control amount is not limited to a fixed value and may be a value which changes according to a certain parameter. The parameter for changing the reference control amount is preferably a value which changes the magnitude of the damping force in the same direction (i.e., a value which increases or reduces the magnitude of the damping force) in both of the rebound operation and the bound operation. Examples of the parameter include a running velocity of the vehicle, an operating speed of a steering operation member, and strength of vibration of the sprung portion.

The absorber system according to this form sets the damping-force generation characteristics for one of the rebound operation and the bound operation and merely sets the extension-compression gain for the other operation. Accordingly, when compared with a configuration in which the damping-force generation characteristics for the one operation and the damping-force generation characteristics for the other operation are set in advance, the present absorber system can greatly reduce the number of man-hours in a design phase and generate an appropriate damping force according to a situation of the vehicle in a simple and easy method of increasing or reducing the set extension-compression gain. In the present form, the target control amount for the one of the rebound operation and the bound operation is determined based on the reference control amount regardless of the extension-compression gain, and the target control amount for the other of the rebound operation and the bound operation is determined based on the reference control amount and the extension-compression gain. In this form, when the extension-compression gain is changed by the extension-compression gain changer, the target control amount for the other operation is changed in accordance with the change in the extension-compression gain, but the target control amount for the one operation is not changed in accordance with the change in the extension-compression gain. Accordingly, a load of a processing for calculating the target control amount is smaller in this form than in a form in which both of the target control amount for the one operation and the target control amount for the other operation are changed in accordance with the change in the extension-compression gain.

The control amount in this form only needs to indicate the magnitude of the damping force. Examples of the control amount include the magnitude of the damping force itself, a damping coefficient, and a current to be supplied to the solenoid.

(2) The absorber system according to the above form (1), wherein the extension-compression gain changer is configured to change the extension-compression gain such that the damping force to be generated by the damping force generator is greater in the driving-stability-emphasized situation than not in the driving-stability-emphasized situation.

The absorber system according to this form is one in which a method for changing the extension-compression gain is embodied. The absorber system according to this form can reduce an amount of lowering of the driving stability.

(3) The absorber system according to the above form (2), wherein the extension-compression gain changer is configured to, when a steering speed is greater than a set speed, determine that the vehicle is in the driving-stability-emphasized situation and change the extension-compression gain, and wherein the extension-compression gain changer is configured not to change the extension-compression gain when the steering speed is equal to or less than the set speed.

(4) The absorber system according to the above form (2) or (3), wherein a skid suppressing system is mounted on the vehicle in which the absorber system is installed, and the skid suppressing system is configured to suppress a skid in turning of the vehicle to maintain stability of the vehicle, wherein the extension-compression gain changer is configured to, when the skid is being suppressed by the skid suppressing system, determine that the vehicle is in the driving-stability-emphasized situation and change the extension-compression gain, and wherein the extension-compression gain changer is configured not to change the extension-compression gain when the skid is not being suppressed by the skid suppressing system.

(5) The absorber system according to any one of the above forms (2) through (4), wherein the extension-compression gain changer is configured to, when a running velocity of the vehicle is greater than a set velocity, determine that the vehicle is in the driving-stability-emphasized situation and change the extension-compression gain, and wherein the extension-compression gain changer is configured not to change the extension-compression gain when the running velocity of the vehicle is equal to or less than the set velocity.

Each of the absorber systems according to these three forms is one in which determination of whether the vehicle is in the driving-stability-emphasized situation or not is embodied. Each of the absorber systems can appropriately determine whether the vehicle is in the driving-stability-emphasized situation or not.

(6) The absorber system according to any one of the above forms (2) through (5), wherein the extension-compression gain changer is configured to change the extension-compression gain such that the damping force to be generated by the damping force generator is less when the driving-stability-emphasized situation is not being established but the ride-comfort-emphasized situation is being established than when the driving-stability-emphasized situation is not being established and the ride-comfort-emphasized situation is not being established.

The absorber system according to this form is one in which the method of changing the extension-compression gain is further embodied. In the absorber system according to this form, a higher priority is given to reducing the lowering of the driving stability than to ensuring satisfactory ride comfort, thereby reliably reducing the lowering of the driving stability. Conversely, the absorber system may be configured to change the extension-compression gain not in the ride-comfort-emphasized situation but in the driving-stability-emphasized situation so as to increase the damping force. This absorber system may be one form of the claimable invention.

(7) The absorber system according to the above form (6), wherein the extension-compression gain changer is configured to, when strength of vibration of the sprung portion is greater than set strength, determine that the vehicle is in the ride-comfort-emphasized situation and change the extension-compression gain, and wherein the extension-compression gain changer is configured not to change the extension-compression gain when the strength of vibration of the sprung portion is equal to or less than the set strength.

(8) The absorber system according to the above form (6) or (7), wherein the extension-compression gain changer is configured to, when a running velocity of the vehicle is less than a set velocity, determine that the vehicle is in the ride-comfort-emphasized situation and change the extension-compression gain, and wherein the extension-compression gain changer is configured not to change the extension-compression gain when the running velocity of the vehicle is equal to or greater than the set velocity.

Each of the absorber systems according to these two forms is one in which a condition used for determination of whether the vehicle is in the ride-comfort-emphasized situation or not is embodied. These absorber systems can appropriately determine whether the vehicle is in the ride-comfort-emphasized situation or not. It is noted that the strength of vibration in the former form refers to a degree of intensity of vibration. In the former form, in the case where an amplitude, a speed of an operation of the sprung portion, acceleration, and so on are relatively high, for example, it is possible to determine that the vehicle is in the ride-comfort-emphasized situation. It is noted that the vibration of the sprung portion may have a particular frequency component (e.g., about 8 Hz) which particularly affects the ride comfort, and the absorber system according to the former form preferably uses strength of this particular frequency component.

(9) The absorber system according to any one of the above forms (1) through (8), wherein the controller is configured to use a current to be supplied to the solenoid, as the control amount.

The control amount is limited in this form. In the absorber system according to this form, the reference control amount determiner determines a reference supply current, and the target control amount determiner determines a target supply current. It is noted that a damping force with respect to the rebound operation and a damping force with respect to the bound operation differ from each other due to the structure of the cylinder even in the case where the same amount of current is supplied. In the absorber system according to this form, the control amount may contain the difference of the damping force due to the structure of the cylinder, only by determination of the extension-compression gain.

(10) The absorber system according to any one of the above forms (1) through (9), wherein the reference control amount determiner is configured to determine the reference control amount such that the damping force to be generated by the damping force generator increases with increase in a running velocity of the vehicle.

The absorber system according to this form is one in which a method of determining the reference control amount is embodied. This configuration can achieve satisfactory ride comfort with a small damping force in the case where the vehicle velocity is low, and can increase the damping force with increase in the vehicle velocity to increase the driving stability.

(11) The absorber system according to any one of the above forms (1) through (10), wherein the one of the operation of the cylinder in extension thereof and the operation of the cylinder in compression thereof is the operation of the cylinder in extension thereof, and said another of the operation of the cylinder in extension thereof and the operation of the cylinder in compression thereof is the operation of the cylinder in compression thereof.

The absorber system according to this form does not adjust the damping force with respect to the rebound operation but adjusts the damping force with respect to the bound operation. The adjustment of the damping force with respect to the bound operation is effective for improving ride comfort when compared with the adjustment of the damping force with respect to the rebound operation. Accordingly, the absorber system according to this form can improve the ride comfort of the vehicle when compared with the case where the absorber system adjusts the damping force with respect to the rebound operation.

(12) The absorber system according to any one of the above forms (1) through (11), wherein the damping force generator comprises a valve mechanism configured to allow working fluid flowing with the extension and compression of the cylinder to pass through the valve mechanism to provide resistance to the flow of the working fluid, and wherein the damping force generator is configured to apply a force which depends on an electromagnetic force generated by the solenoid, to the valve mechanism to change a valve opening pressure of the valve mechanism to change the damping force according to the current supplied to the solenoid.

The absorber system according to this form is one in which the damping force generator is embodied. The damping force generator in this form may be configured to adjust pressure differential between front and rear portions of the valve member or configured such that the solenoid directly applies a force to the valve member to change the valve opening pressure of the valve member, (13) The absorber system according to the above form (12), wherein the damping force generator comprises: a main fluid passage through which the working fluid flows in the extension and compression of the cylinder; a main valve, as the valve mechanism, provided in the main fluid passage; a bypass passage provided so as to bypass the main valve; a pilot chamber formed in the bypass passage to apply an internal pressure to the main valve in a direction in which the main valve is closed; and a pilot valve comprising the solenoid and configured to change the internal pressure of the pilot chamber according to the current supplied to the solenoid, and wherein the pilot valve is configured to change the internal pressure of the pilot chamber to change a valve opening pressure of the main valve.

The absorber system according to this form is one in which the damping force generator is further embodied, and the damping force generator is constituted mainly by what is called a pilot electromagnetic valve. The damping force generator according to this form is configured to adjust the pressure differential between the front and rear portions of the valve member, thereby controlling the damping force with high response.

(14) The absorber system according to the above form (9), wherein the damping force generator comprises one solenoid as the solenoid, wherein the controller is configured to supply a current of a magnitude corresponding to the target control amount for the one of the operation of the cylinder in extension thereof and the operation of the cylinder in compression thereof, as the current to be supplied to the solenoid, to the one solenoid, and wherein the controller is configured to supply a current of a magnitude corresponding to the target control amount for said another of the operation of the cylinder in extension thereof and the operation of the cylinder in compression thereof, as the current to be supplied to the solenoid, to the one solenoid.

In the present form, the supply current for the one operation and the supply current for said another operation are supplied to the same solenoid (i.e., the one solenoid) in each of the one operation and said another operation. The supply current in each operation is set based on the extension-compression gain which is set based on the configuration of the damping force generator including the cylinder and the one solenoid, thereby setting the supply current in each operation to an appropriate value.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

There will be described in detail one embodiment according to the claimable invention, referring to the drawings. It is to be understood, however, that the claimable invention is not limited to the details of the following embodiment but may be embodied with various changes and modifications, such as those described in the FORMS OF THE INVENTION, which may occur to those skilled in the art. Also, the techniques described in the FORMS OF THE INVENTION may be used to achieve modifications of the embodiment which will be described later.

[A] Configuration of Absorber System for Vehicle

Figure 1:
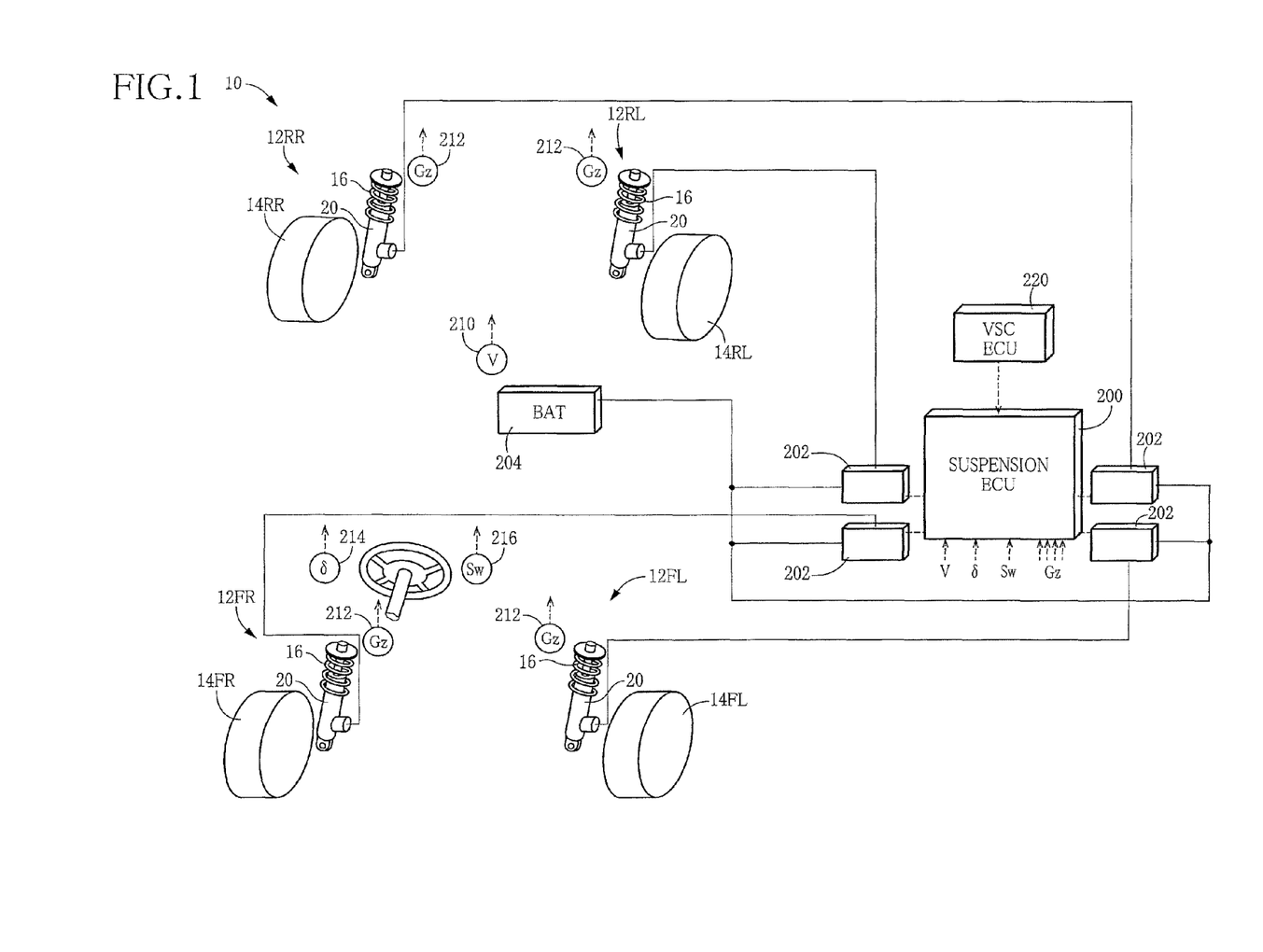
FIG. 1 is a schematic view illustrating an absorber system for a vehicle according to one embodiment of the claimable invention.

FIG. 1 schematically illustrates a suspension system 10 including a hydraulic absorber system according to one embodiment of the claimable invention. The present suspension system 10 for a vehicle includes four independent suspension devices 12 respectively corresponding to front left and right and rear left and right wheels 14. Each of the suspension devices 12 is provided between a suspension lower arm and a mount portion so as to connect these components to each other. The suspension lower arm holds a corresponding one of the wheels 14 and constitutes a portion of an unsprung portion, and the mount portion is provided on a vehicle body and constitutes a sprung portion. Each of the suspension devices 12 includes a coil spring 16 as a suspension spring and a hydraulic shock absorber 20 which are arranged between the lower arm and the mount portion in parallel with each other. The four wheels 14 and the four suspension devices 12 are collectively referred, and where it is necessary to distinguish the four wheels 14 from each other and to distinguish the four suspension devices 12 from each other, there are attached suffixes FL, FR, RL, and RR respectively indicating the front left wheel, the front right wheel, the rear left wheel, and the rear right wheel. It is noted that the suspension devices 12 have the same configuration, and the following explanation will be given for one of the suspension devices 12 for simplicity unless otherwise specified.

Figure 2:
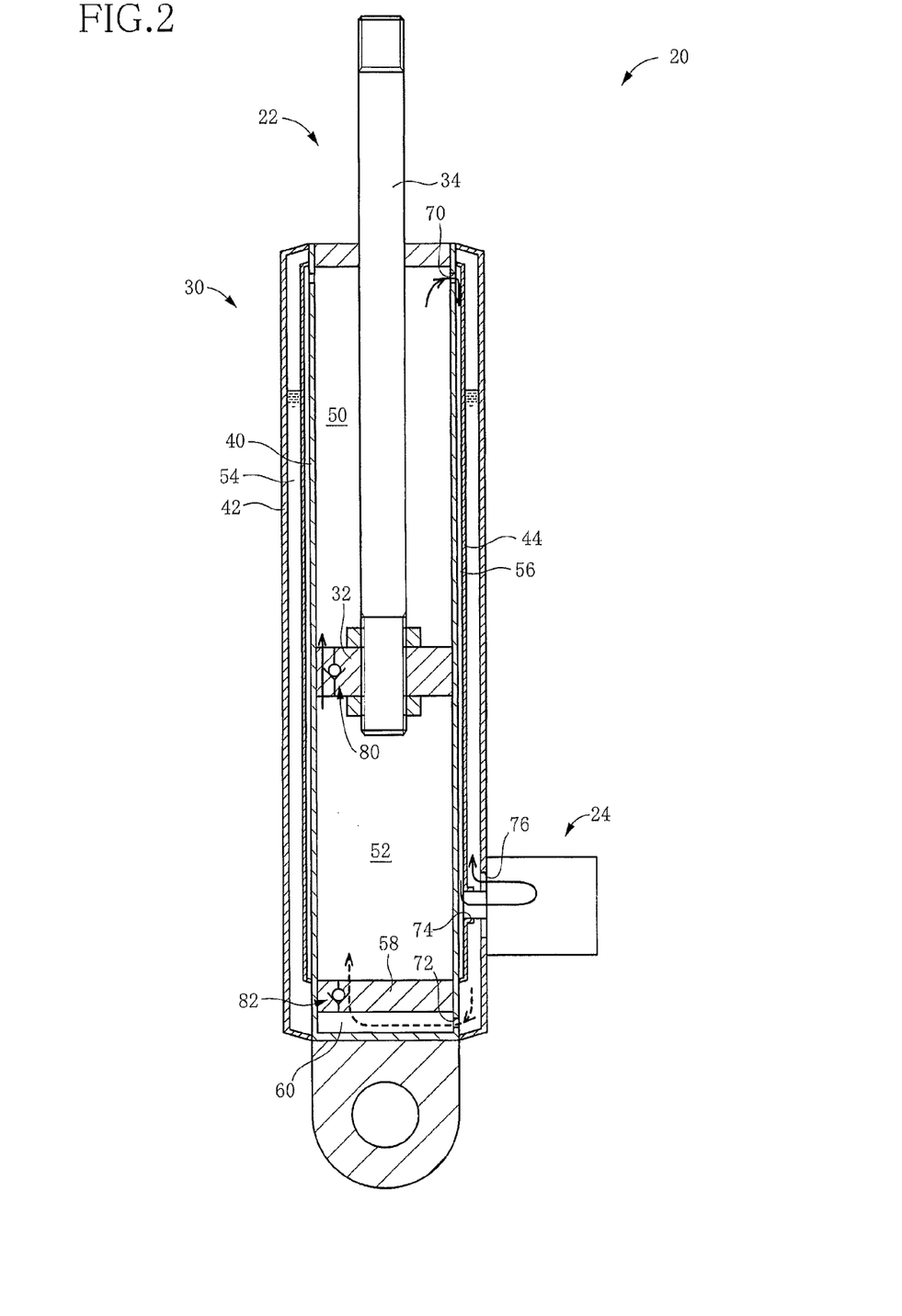
FIG. 2 is a cross-sectional view schematically illustrating a shock absorber of the absorber system according to the present embodiment.

As illustrated in FIG. 2, the hydraulic shock absorber 20 mainly includes a cylinder 22 and a damping force generator 24. The cylinder 22 includes: a housing 30; a piston 32 provided in the housing 30 so as to be movable in the up and down direction; and a rod 34, one end portion (i.e., a lower end portion) of which is coupled to the piston 32, and the other end portion (i.e., an upper end portion) of which extends upward from the housing 30. The housing 30 is coupled to the lower arm, and the upper end portion of the rod 34 to the mount portion. That is, the cylinder 22 is extended when the sprung portion and the unsprung portion are moved relative to each other in a direction away from each other (noted that this case may be hereinafter referred to as "in the rebound operation" or "in rebounding"), and the cylinder 22 is compressed when the sprung portion and the unsprung portion are moved relative to each other in a direction toward each other (noted that this case may be hereinafter referred to as "in the bound operation" or "in bounding").

The housing 30 includes: a main tube 40 having a closed bottom; an outer tube 42 provided on an outer circumferential side of the main tube 40; and an inter tube 44 provided between the main tube 40 and the outer tube 42. That is, the housing 30 generally has threefold structure. The piston 32 is slidably provided on an inner side of the main tube 40. The piston 32 divides the interior of the main tube 40 into two fluid chambers, namely, a rod-side chamber 50 and a no-rod-side chamber 52. A buffer chamber (which may be also referred to as "reservoir") 54 for storing working fluid is formed between the main tube 40 and the outer tube 42. An annular fluid passage 56 is formed between the inner peripheral surface of the inter tube 44 and the outer peripheral surface of the main tube 40. In an inner bottom portion of the main tube 40, a partition 58 is provided for defining a bottom of the no-rod-side chamber 52. A bottom fluid passage 60 is formed between the partition 58 and a bottom wall of the main tube 40.

An upper portion of the main tube 40 has a communication opening 70 for a flow of the working fluid between the fluid passage 56 and the rod-side chamber 50. A lower end portion of the main tube 40 has a bottom communication opening 72 for a flow of the working fluid between the buffer chamber 54 and the bottom fluid passage 60. A lower portion of the inter tube 44 has an outlet opening 74 which allows the working fluid to flow from the fluid passage 56 into the damping force generator 24. The outer tube 42 has an inlet opening 76 which allows the working fluid to flow from the damping force generator 24 into the buffer chamber 54.

Though explained later in detail, the damping force generator 24 is disposed so as to cover the outlet opening 74 and the inlet opening 76, and the damping force generator 24 functions to allow the working fluid to pass therethrough in a flow from the rod-side chamber 50 into the buffer chamber 54 via the fluid passage 56 and the damping force generator 24 and also functions to provide resistance to the flow of the working fluid.

In the bound operation of the cylinder 22, as indicated by the sold arrows in FIG. 2, the working fluid flows from the no-rod-side chamber 52 into the rod-side chamber 50 via a check valve 80 provided on the piston 32. An amount of the working fluid flowing into the rod-side chamber 50 is larger than an amount by which the volume of the rod-side chamber 50 increases with the operation of the piston 32. Accordingly, the working fluid flows from the rod-side chamber 50 into the buffer chamber 54 via the communication opening 70, the fluid passage 56, and the damping force generator 24. The damping force generator 24 provides resistance to this flow of the working fluid, yielding a damping force with respect to the compression of the cylinder 22, i.e., a damping force with respect to the bound operation.

In the rebound operation, on the other hand, the working fluid flows from the rod-side chamber 50 into the buffer chamber 54 via the communication opening 70, the fluid passage 56, and the damping force generator 24 as in the bound operation. The damping force generator 24 provides resistance to this flow of the working fluid, yielding a damping force with respect to the cylinder 22, i.e., a damping force with respect to the rebound operation. It is noted that, as indicated by the broken-line arrows in FIG. 2, the working fluid flows into the no-rod-side chamber 52 of the cylinder 22 from the buffer chamber 54 via the bottom communication opening 72, the bottom fluid passage 60, and a check valve 82 provided on the partition 58.

Figure 3:
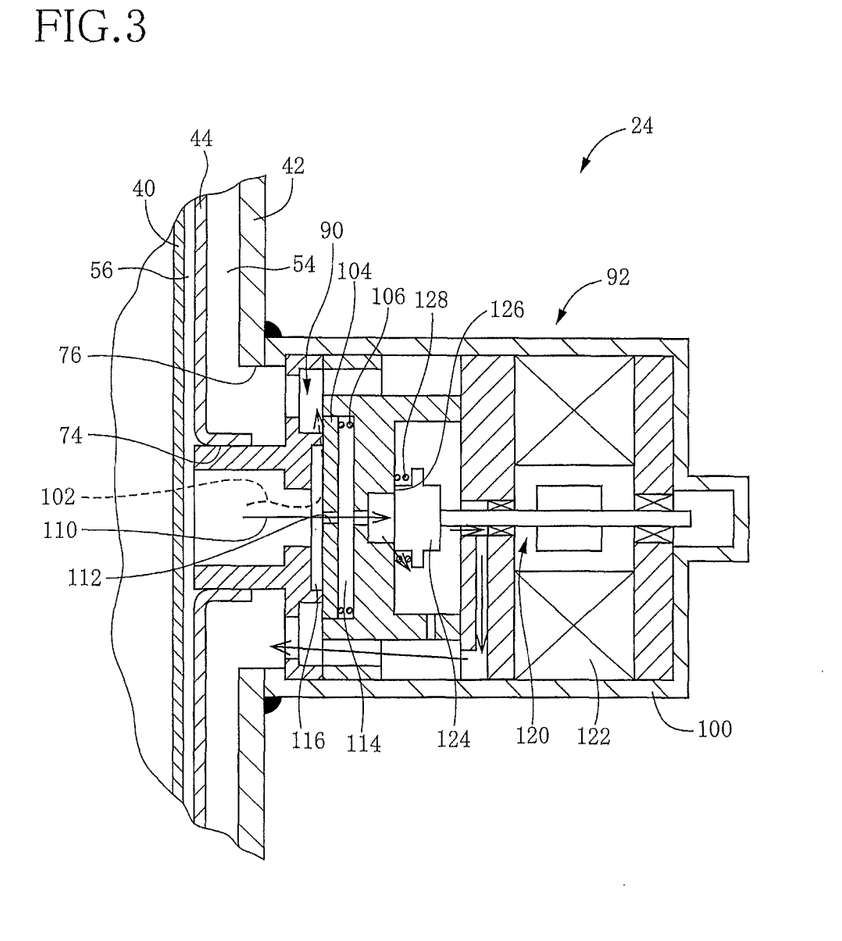
FIG. 3 is a cross-sectional view illustrating a damping force generator illustrated in FIG. 2.

There will be next explained a configuration and operations of the damping force generator 24 with reference to FIG. 3. It is noted that the damping force generator 24 is well known (for example, the damping force generator 24 is disclosed in, e.g., Japanese Patent Application Publication No. 2011-132995), and a simple explanation of which will be provided. The damping force generator 24 mainly includes: a main valve 90 for providing resistance to the working fluid passing through the damping force generator 24; and a pilot valve 92 for adjusting a valve opening pressure of the main valve 90. The damping force generator 24 is constituted mainly by what is called a pilot electromagnetic valve.

The main valve 90 and the pilot valve 92 are provided in a lidded housing 100 having a substantially cylindrical shape. As indicated by the broken-line arrow in FIG. 3, the housing 100 has a main fluid passage 102 which is a main portion of a passage through which the working fluid flows when the cylinder 22 is extended or compressed. The main valve 90 is provided in the main fluid passage 102, and a valve member 104 of the main valve 90 is urged by a compression coil spring 106 in a direction in which the valve member 104 is seated. In an open state, the main valve 90 allows the working fluid to flow through the main fluid passage 102 and provides resistance to the flow of the working fluid.

As indicated by the solid arrow in FIG. 3, the housing 100 has a bypass passage 110 extending so as to bypass the main valve 90. A fixed orifice 112, a pilot chamber 114, and the pilot valve 92 are formed or provided in the bypass passage 110 so as to be arranged in this order from an upstream side. A front chamber 116 is defined in front of the main valve 90 (on a left side of the main valve 90 in FIG. 3. The pilot chamber 114 has an internal pressure that is applied to the main valve 90 in a direction in which the main valve 90 is to be opened. That is, the main valve 90 is opened when a force acting by a pressure differential between hydraulic pressure in the front chamber 116 and hydraulic pressure in the pilot chamber 114 exceeds the urging force of the spring 106. The fixed orifice 112 is formed through the valve member 104 of the main valve 90 and provides resistance to a flow of the working fluid from the front chamber 116 to the pilot chamber 114.

The pilot valve 92 includes: a valve movable member 120 and a solenoid 122 which is energized to produce an electromagnetic force for actuating or moving the valve movable member 120. The pilot valve 92 is provided in the bypass passage 110 at a position located downstream of the pilot chamber 114. The valve movable member 120 includes a poppet valve head 124 and is constructed such that the valve head 124 is moved off or seated on a valve seat 126 to open or close the pilot chamber 114. The valve movable member 120 is urged by a compression coil spring 128 in a direction in which the valve head 124 is to be moved off the valve seat 126. When the solenoid 122 is energized, the valve movable member 120 receives an urging force in a direction in which the valve head 124 is to be seated on the valve seat 126.

With the configuration described above, the pilot valve 92 can adjust a degree of opening of the pilot chamber 114, in other words, the pilot valve 92 can adjust an amount of the working fluid flowing from the pilot chamber 114 to a downstream side thereof. That is, the pilot valve 92 can adjust the hydraulic pressure in the pilot chamber 114 to adjust the valve opening pressure of the main valve 90. It is noted that the valve opening pressure of the main valve 90 depends on the magnitude of a current supplied to the solenoid 122 of the pilot valve 92. With increase in the current, a degree of opening of the pilot valve 92 decreases, the hydraulic pressure in the pilot chamber 114 increases, and the valve opening pressure of the main valve 90 also increases.

Figure 4:
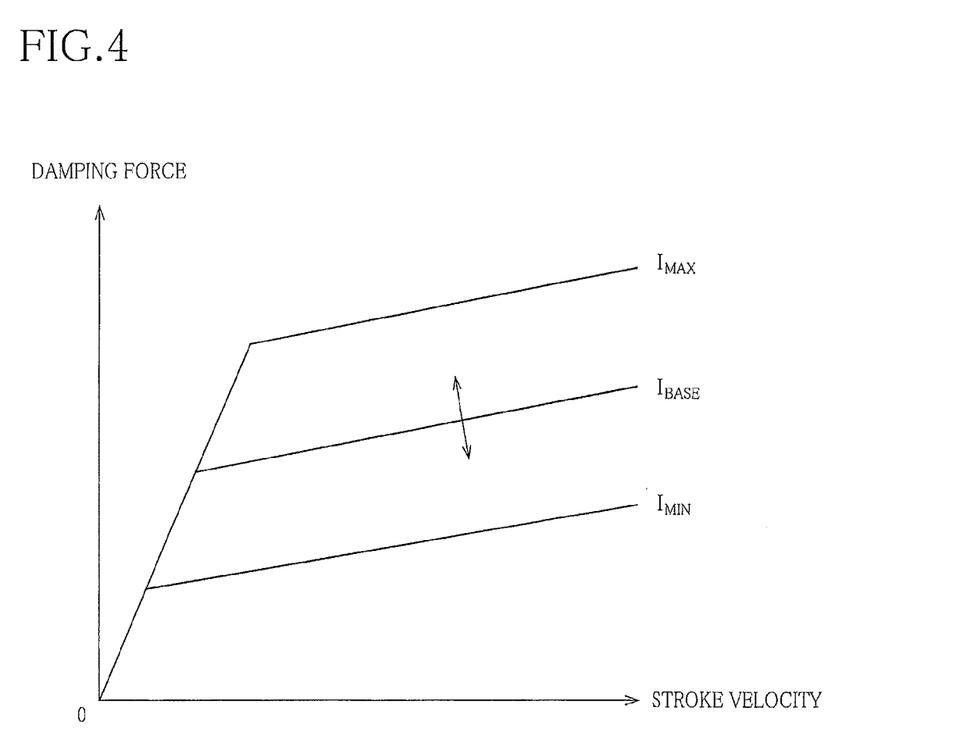
FIG. 4 is a graph illustrating damping characteristics of the damping force generator illustrated in FIG. 3.

The damping force generator 24 has damping characteristics (in the rebound operation) as illustrated in FIG. 4. In the case where a velocity $v_{st}$ (hereinafter may be referred to as "stroke velocity") of a relative operation or movement between the sprung portion and the unsprung portion is relatively low, the main valve 90 is not open, and the damping force F depends on resistance provided to the flow of the working fluid passing through the fixed orifice 112 formed in the main valve 90. When the pressure differential between the front chamber 116 and the pilot chamber 114 increases, and the main valve 90 is opened, the damping force F depends on resistance provided to the flow of the working fluid passing through the main valve 90. With increase in the current supplied to the solenoid 122, the valve opening pressure of the main valve 90 increases as described above, that is, the damping force increases.

Since the shock absorber 20 is configured as described above, an amount of change in the volume of the housing 30 with respect to an amount of stroke varies between the rebound operation and the bound operation, that is, an amount of the working fluid flowing into the damping force generator 24 varies between the rebound operation and the bound operation even if the piston 32 is stroked by the same amount. That is, in the case where the amount of the current supplied to the solenoid 122 is kept constant, the magnitude of the damping force generated by the damping force generator 24 varies between the rebound operation and the bound operation. Specifically, in the bound operation, the flow rate of the working fluid is lower than that in the rebound operation, and the damping force generated by the damping force generator 24 is smaller than that in the rebound operation. In other words, to make the damping force with respect to the bound operation equal to the damping force with respect to the rebound operation, the supply current in the bound operation needs to be made greater than the supply current in the rebound operation.

The present suspension system 10 includes a controller in the form of a suspension electronic control unit 200 (hereinafter may be referred to as "suspension ECU 200") which controls the shock absorber 20. The ECU 200 is constituted mainly by a computer including a CPU, a ROM, and a RAM. Drive circuits 202 are connected to the ECU 200. These drive circuits 202 are provided respectively corresponding to the damping force generators 24 of the respective shock absorbers 20. Each of the drive circuits 202 can adjust a current to be supplied to a corresponding one of the damping force generators 24. The drive circuits 202 are connected to a battery [BAT] 204 which supplies a current to each of the damping force generators 24 of the respective shock absorbers 20.

The vehicle is provided with various sensors including: a vehicle velocity sensor [V] 210 for detecting a running velocity of the vehicle (hereinafter may be referred to as "vehicle velocity"); four sprung acceleration sensors [Gz] 212 each for detecting vertical acceleration of the sprung portion of the vehicle body which corresponds to a corresponding one of the wheels 14; and a steering amount sensor [δ] 214 for detecting an operation angle of a steering operation member. These sensors are connected to the computer of the ECU 200. The vehicle is also provided with a mode selection switch 216 which is operated by an occupant. The occupant can operate the mode selection switch 216 to establish an ON state of one of a driving-stability-emphasized mode in which driving stability is given a higher priority and a ride-comfort-emphasized mode in which ride comfort is given a higher priority or establish an OFF state of each of the driving-stability-emphasized mode and the ride-comfort-emphasized mode. The suspension ECU 200 controls the shock absorbers based on signals output from the sensor. It is noted that the above-described bracketed character or characters are a reference sign indicating the corresponding component in FIG. 1. The ROM of the computer of the suspension ECU 200 stores programs, data, and other similar information relating to the control of the shock absorber 20.

A VSC (Vehicle Stability Control) system is installed in the vehicle. This VSC system is for suppressing skids in turning of the vehicle to maintain the stability of the vehicle. A VSC-ECU 220 for controlling the system is connected to the suspension ECU 200. The suspension ECU 200 can acquire information from the VSC-ECU 220.

[B] Control of Damping Force a) Determination of Reference Supply Current

The suspension ECU 200 uses the current to be supplied to the solenoid 122 as an control amount to control the current to be supplied to the solenoid 122, thereby controlling the damping force generated by the damping force generator 24. In the control executed by the present suspension system 10, essentially, a damping force relating to a vehicle velocity V is generated to reduce or suppress vibration of the vehicle. Specifically, the supply current I is controlled such that the damping force F increases with increase in the vehicle velocity V, that is, the valve opening pressure of the main valve 90 increases with increase in the vehicle velocity V. Specifically, the RAM of the ECU 200 stores map data illustrated in FIG. 5, and the ECU 200 refers to the map data to determine a reference supply current $I_{BASE}$ as a reference for the current supplied to the solenoid 122 with respect to the vehicle velocity V detected by the vehicle velocity sensor 210, that is, the ECU 200 determines a reference control amount with respect to the vehicle velocity V detected by the vehicle velocity sensor 210.

b) Determination of Target Supply Current

In the present absorber system, the reference supply current is set so as to generate the damping force having the magnitude to be achieved in the rebound operation. That is, in the rebound operation of the cylinder 22, a target supply current I* which is a target current to be supplied to the solenoid 122 is determined at a reference supply current $I_{BASE}$. In the bound operation of the cylinder 22, on the other hand, a target supply current to be supplied to the solenoid is determined at a value obtained by multiplying the reference supply current by a preset extension/compression gain K.

$$I^* = I_{BASE} \text{(in the rebound operation)}$$

$$I^* = K \cdot I_{BASE} \text{(in the bound operation)}$$

Figure 5:
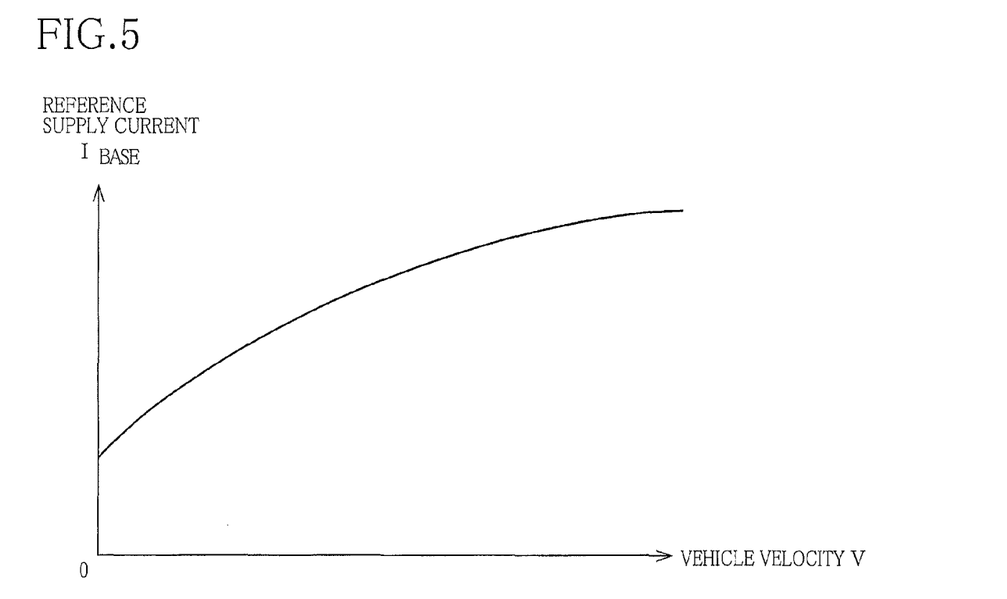
FIG. 5 is a graph illustrating a relationship between a reference supply current and a vehicle velocity.

The extension/compression gain K is set based on (i) a ratio between the damping force in the rebound operation and the damping force in the bound operation which are generated due to the structure of the shock absorber 20 and (ii) a ratio between the damping force to be achieved in the rebound operation and the damping force to be achieved in the bound operation. In the present absorber system, the map data as illustrated in FIG. 5 is not set for the bound operation, resulting in great reduction of the number of man-hours in a design phase. Also, as described above, the shock absorber 20 includes the one solenoid 122, and the target supply current I* in the rebound operation is supplied to the solenoid 122 in the rebound operation, and the target supply current I* in the bound operation is supplied to the solenoid 122 in the bound operation. That is, the target supply current I* are supplied to the same solenoid 122 in the rebound operation and in the bound operation. The target supply current I* in each operation is determined based on the extension-compression gain which is set based on (i) a ratio between the damping force in the rebound operation due to the structure of the shock absorber 20 and the damping force in the bound operation and (ii) a ratio between the damping force to be generated in the rebound operation and the damping force to be generated in the bound operation, thereby making a target supply current in each operation an appropriate value.

In the present absorber system, the reference supply current is set so as to generate the damping force to be achieved in the rebound operation, and the reference supply current is multiplied by the extension/compression gain in determination of the target supply current for the bound operation. However, the present absorber system may be configured such that the reference supply current is set so as to generate the damping force to be achieved in the bound operation, and the reference supply current is multiplied by the extension/compression gain in determination of the target supply current for the rebound operation.

c) Change in Extension/Compression Gain

To improve the driving stability and the ride comfort of the vehicle, in the present absorber system, the extension/compression gain K is changed from a reference gain value $K_0$ which is a value in a normal condition. First, it is determined whether the mode selection switch 216 has been operated or not. When the driving-stability-emphasized mode is in the ON state, the extension/compression gain K is to be changed to a driving-stability-emphasized gain value $K_1$ which is larger than the reference gain value $K_0$. When the ride-comfort-emphasized mode is in the ON state, the extension/compression gain K is to be changed to a ride-comfort-emphasized gain value $K_2$ which is smaller than the reference gain value $K_0$.

When the mode selection switch 216 is in the OFF state, that is, when the driving-stability-emphasized mode is not in the ON state, or the ride-comfort-emphasized mode is not in the ON state, it is determined whether the current situation is the driving-stability-emphasized situation or not. Specifically, it is determined that the current situation is the driving-stability-emphasized situation when information indicating that the VSC is being executed is received from the VSC-ECU 220, when a steering speed δ' estimated from a value detected by the steering amount sensor 214 exceeds a set steering speed $δ'_0$, or when the vehicle velocity V detected by the vehicle velocity sensor 210 exceeds a set velocity $V_0$. When it is determined that the current situation is the driving-stability-emphasized situation, the extension/compression gain K is changed from the reference gain value $K_0$ to the driving-stability-emphasized gain value $K_1$. It is noted that it may be determined that the current situation is the driving-stability-emphasized situation, based on that the driving-stability-emphasized mode of the mode selection switch 216 is in the ON state.

When it is determined that the current situation is not the driving-stability-emphasized situation, it is determined whether the current situation is the ride-comfort-emphasized situation or not. Specifically, a filter processing is executed first for the sprung acceleration detected by the sprung acceleration sensor 212 to extract a component of a frequency range (about 8 Hz) which greatly affects the ride comfort of the vehicle. Then, an amplitude a of the extracted frequency component is acquired, and it is determined whether the amplitude a of the particular frequency component is greater than a set amplitude $a_1$ or not. When the amplitude a of the particular frequency component is the set amplitude $a_1$, it is determined that the current situation is the ride-comfort-emphasized situation, and the extension/compression gain K is changed to the ride-comfort-emphasized gain value $K_2$. Also when the vehicle velocity V is less than a set velocity the extension/compression gain K is changed from the reference gain value $K_0$ to the ride-comfort-emphasized gain value $K_2$. It is noted that it may be determined that the current situation is the ride-comfort-emphasized situation, based on that the ride-comfort-emphasized mode of the mode selection switch 216 is in the ON state.

In the present embodiment as described above, the target control amount in the rebound operation is determined based on the reference control amount regardless of the extension-compression gain K, and the target control amount in the bound operation is determined based on the extension-compression gain K and the reference control amount in the rebound operation. In this configuration, when the extension-compression gain K is changed based on a change in the state of the vehicle (e.g., a changed in the driving-stability-emphasized situation or a change in the ride-comfort-emphasized situation), the target control amount in the bound operation is changed based on a change in the extension-compression gain K (from $K_0$ to $K_1$ or from $K_0$ to $K_2$), but the target control amount in the rebound operation is not changed based on the change in the extension-compression gain K. Accordingly, in the present embodiment, a load for calculating the target control amount is reduced when compared with a case where both of the target control amount in the rebound operation and the target control amount in the bound operation are changed when changing the damping force to be generated in the shock absorber.

[C] Control Program

Figure 6:
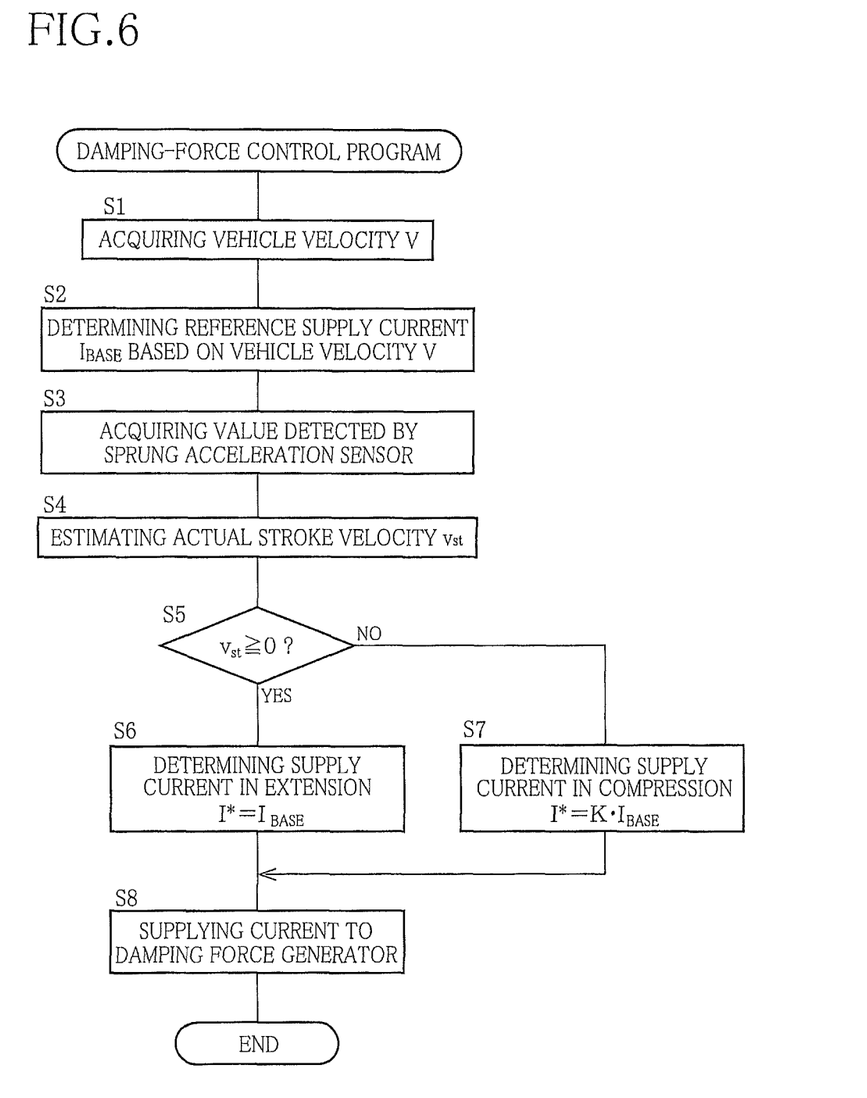
FIG. 6 is a flow chart illustrating a damping-force control program which is executed by a controller illustrated in FIG. 1.
Figure 7:
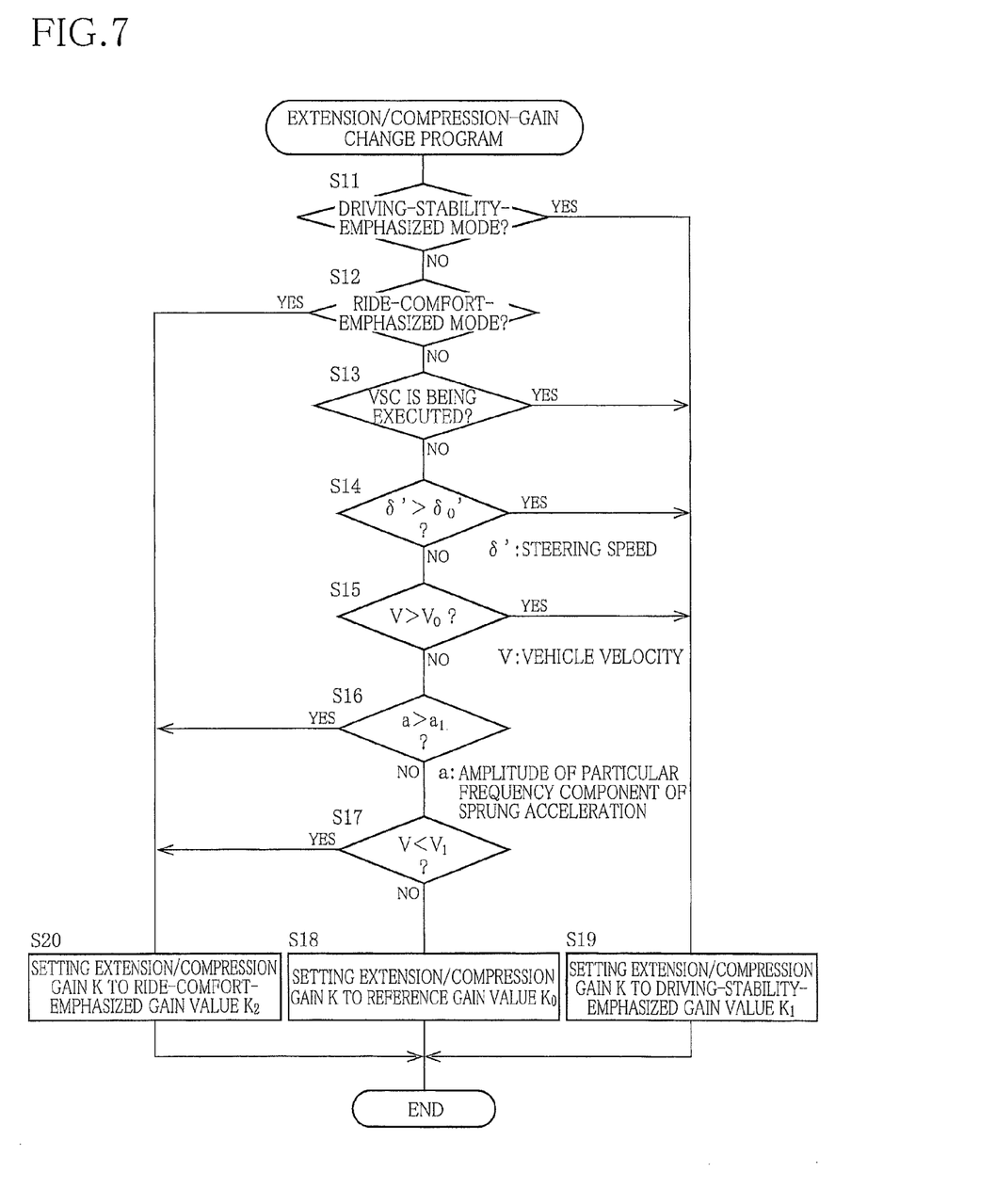
FIG. 7 is a flow chart illustrating an extension/compression-gain change program which is executed by the controller illustrated in FIG. 1.

In the present embodiment, the ECU 200 executes the control of the suspension system 10 by executing a damping-force control program illustrated in FIG. 6 for each shock absorber 20 and executing an extension/compression-gain change program illustrated in FIG. 7. It is noted that these programs are repeatedly executed at intervals of a relatively short time, e.g., from several microseconds to several tens of microseconds.

The flow according to the damping-force control program begins with Step 1 ("Step" is omitted where appropriate) at which the ECU 200 acquires the vehicle velocity V from the vehicle velocity sensor 210. The ECU 200 at S2 refers to the map data illustrated in FIG. 5 to determine the reference supply current $I_{BASE}$ based on the vehicle velocity V. The ECU 200 at S3 acquires the detection value of the sprung acceleration sensor 212 and at S4 estimates an actual stroke velocity $v_{st}$. The ECU 200 at S5 determines a direction of the stroke based on whether the estimated stroke velocity $v_{st}$ is a positive value or a negative value. When the stroke velocity $v_{st}$ is a positive value at which the rebound operation is being performed, the ECU 200 at S6 determines the target supply current I* to be supplied to the solenoid 122, to the reference supply current $I_{BASE}$. When the stroke velocity $v_{st}$ is a negative value at which the bound operation is being performed, the ECU 200 at S7 determines the target supply current I* to be supplied to the solenoid 122, to a value obtained by multiplying the reference supply current $I_{BASE}$ by the extension/compression gain K determined in the extension/compression-gain change program.

Upon determination of the target supply current I* to be supplied to the solenoid 122, the ECU 200 at S8 instructs the drive circuit 202 to supply the determined magnitude of current to the solenoid 122, and one execution of the damping-force control program is finished.

The flow according to the extension/compression-gain change program begins with S11 at which the ECU 200 determines whether the driving-stability-emphasized mode is in the ON state or not as a result of the operation for the mode selection switch 216. When the driving-stability-emphasized mode is in the ON state, the ECU 200 at S19 sets the extension/compression gain K to the driving-stability-emphasized gain value $K_1$. When the driving-stability-emphasized mode is not in the ON state, the ECU 200 at S12 determines whether the ride-comfort-emphasized mode is in the ON state or not as a result of the operation for the mode selection switch 216. When the ride-comfort-emphasized mode is in the ON state, the ECU 200 at S20 sets the extension/compression gain K to the ride-comfort-emphasized gain value $K_2$.

When the mode selection switch 216 is in the OFF state, the ECU 200 determines at S13-S15 whether the current situation is the driving-stability-emphasized situation or not. Specifically, the ECU 200 at S13 determines whether the VSC is being executed or not, at S14 determines whether the steering speed $\delta'$ is greater than the set steering speed $\delta'$ or not, and at S15 determines whether the vehicle velocity V is greater than the set velocity $V_0$ or not. When the VSC is being executed, the steering speed $\delta'$ is greater than the set steering speed $\delta'_0$, or the vehicle velocity V is greater than the set velocity $V_0$, the current situation is the driving-stability-emphasized situation, and accordingly the ECU 200 at S19 sets the extension/compression gain K to the driving-stability-emphasized gain value $K_1$.

When the current situation is not the driving-stability-emphasized situation, the ECU 200 at S16 and S17 determines whether the current situation is the ride-comfort-emphasized situation or not. Specifically, at S16, the ECU 200 executes a filter processing first for the sprung acceleration detected by the sprung acceleration sensor 212 to extract the component of the frequency range (about 8 Hz) which greatly affects the ride comfort of the vehicle. The ECU 200 then acquires the amplitude a of the extracted frequency component and determines whether the amplitude a of the particular frequency component is greater than the set amplitude $a_1$ or not. When the amplitude a of the particular frequency component is the set amplitude $a_1$, the ECU 200 determines that the current situation is the ride-comfort-emphasized situation. At S20, the ECU 200 sets the extension/compression gain K to the ride-comfort-emphasized gain value $K_2$.

When the amplitude a of the particular frequency component is equal to or less than the set amplitude $a_1$, the ECU 200 at S17 determines whether the vehicle velocity V is less than the set velocity $V_1$ or not. When the vehicle velocity V is less than the set velocity $V_1$, the ECU 200 determines that the current situation is the ride-comfort-emphasized situation and at S20 sets the extension/compression gain K to the ride-comfort-emphasized gain value $K_2$.

When the current situation is neither the driving-stability-emphasized situation nor the ride-comfort-emphasized situation, the ECU 20 at S18 sets the extension/compression gain K to the reference gain value $K_0$, and one execution of the extension/compression-gain change program is finished. The extension/compression gain K set in the present program is used in the damping-force control program.

[D] Functional Configuration of Controller

Figure 8:
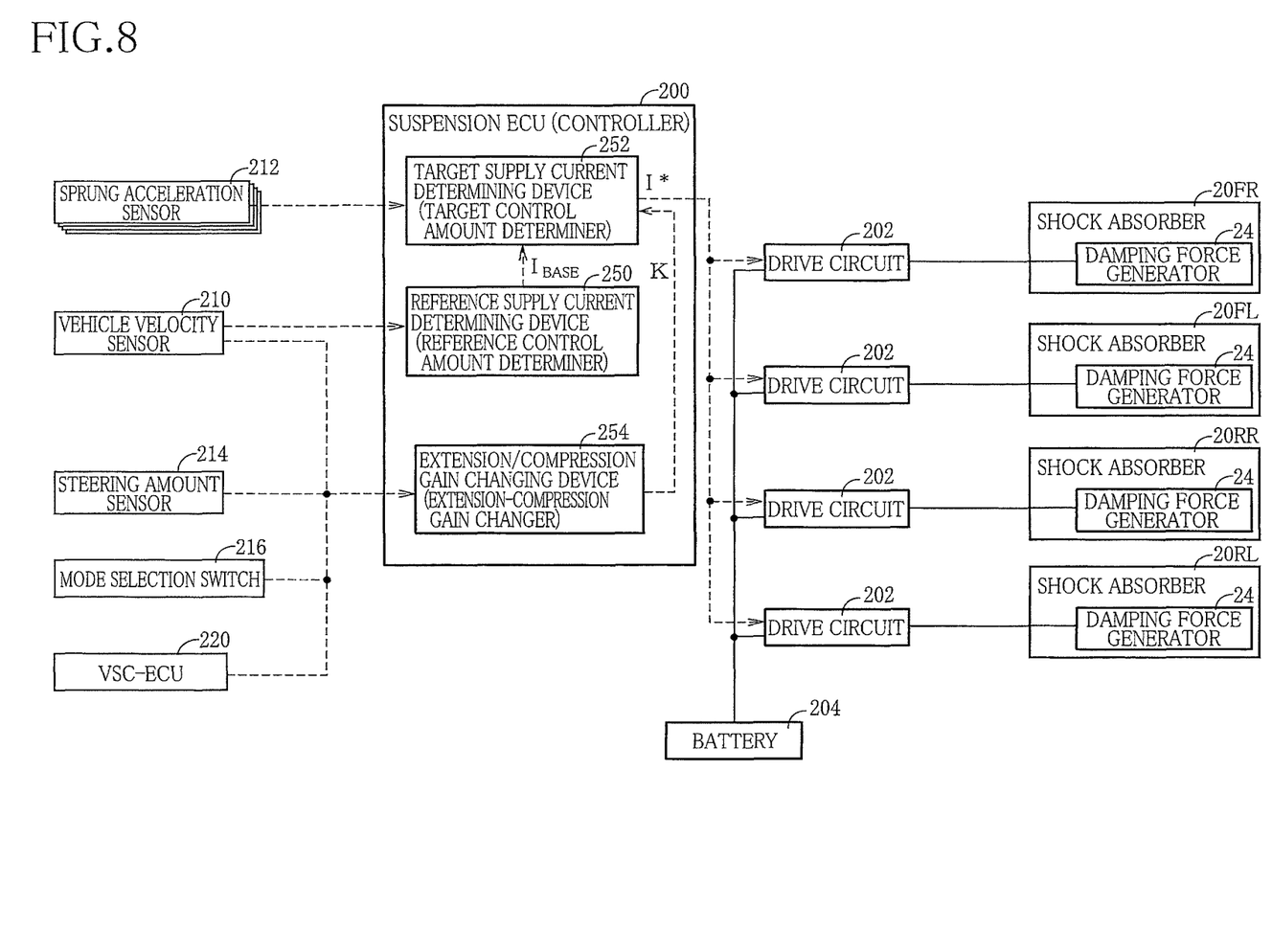
FIG. 8 is a block diagram illustrating functions of the controller illustrated in FIG. 1.

As the controller configured to execute the above-described control, the suspension ECU 200 may be considered to include various kinds of functional sections configured to execute the various kinds of processings. Specifically, as illustrated in FIG. 8, the suspension ECU 200 includes: a reference supply current determining device 250 as one example of a reference control amount determiner configured to determine the reference supply current which is used as a reference in determination of the target supply current; a target supply current determining device 252 as one example of a target control amount determiner configured to determine the target supply current to the reference supply current for the rebound operation and determine the extension/compression gain to the reference supply current for the bound operation; and an extension/compression gain changing device 254 as one example of an extension-compression gain changer configured to change the extension/compression gain when the current situation is any one of the driving-stability-emphasized situation and the ride-comfort-emphasized situation.

In the ECU 200 of the present suspension system 10, the reference supply current determining device 250 has a portion which executes the processings at S1 and S2 in the damping-force control program. The target supply current determining device 252 has a portion which executes the processings S3-S7 in the damping-force control program. The extension/compression gain changing device 254 has a portion which executes the extension/compression-gain change program.

What is claimed is:

1. An absorber system for a vehicle, comprising:
    a cylinder comprising: a housing configured to store working fluid; a piston slidably provided in the housing; and a rod whose one end portion is coupled to the piston and another end portion extends from the housing, the cylinder being provided so as to connect a sprung portion and an unsprung portion of the vehicle to each other, the cylinder being extended and compressed by relative movement of the sprung portion and the unsprung portion;
    a damping force generator configured to generate a damping force with respect to an operation of the cylinder in extension thereof and an operation of the cylinder in compression thereof by providing resistance to a flow of the working fluid which is caused by the extension and compression of the cylinder, the damping force generator comprising a solenoid and being capable of changing a magnitude of the damping force to be generated, based on a current supplied to the solenoid; and
    a controller configured to control the damping force generator to control the damping force with respect to the operation of the cylinder in extension thereof and the operation of the cylinder in compression thereof,
    the controller comprising:
        a reference control amount determiner configured to determine a reference control amount as a reference of a target control amount which is a target of a control amount for controlling the damping force with respect to the operation of the cylinder in extension thereof and the operation of the cylinder in compression thereof, the reference control amount serving as the reference in determination of the target control amount;
        a target control amount determiner configured to determine the target control amount to the reference control amount for one of the operation of the cylinder in extension thereof and the operation of the cylinder in compression thereof and determine the target control amount to a value obtained by multiplying the reference control amount by an extension-compression gain for another of the operation of the cylinder in extension thereof and the operation of the cylinder in compression thereof, the extension-compression gain being based on a ratio between a damping force to be achieved in the operation of the cylinder in extension thereof and a damping force to be achieved in the operation of the cylinder in compression thereof; and an extension-compression gain changer configured to change the extension-compression gain in at least one of a driving-stability-emphasized situation in which driving stability of the vehicle is to be emphasized and a ride-comfort-emphasized situation in which ride comfort of the vehicle is to be emphasized.

2. The absorber system according to claim 1, wherein the controller is configured to use a current to be supplied to the solenoid, as the control amount.

3. The absorber system according to claim 2,
wherein the damping force generator comprises one solenoid as the solenoid,
wherein the controller is configured to supply a current of a magnitude corresponding to the target control amount for the one of the operation of the cylinder in extension thereof and the operation of the cylinder in compression thereof, as the current to be supplied to the solenoid, to the one solenoid, and
wherein the controller is configured to supply a current of a magnitude corresponding to the target control amount for said another of the operation of the cylinder in extension thereof and the operation of the cylinder in compression thereof, as the current to be supplied to the solenoid, to the one solenoid.

4. The absorber system according to claim 1, wherein the one of the operation of the cylinder in extension thereof and the operation of the cylinder in compression thereof is the operation of the cylinder in extension thereof, and said another of the operation of the cylinder in extension thereof and the operation of the cylinder in compression thereof is the operation of the cylinder in compression thereof.

5. The absorber system according to claim 1, wherein the extension-compression gain changer is configured to change the extension-compression gain such that the damping force to be generated by the damping force generator is greater in the driving-stability-emphasized situation than not in the driving-stability-emphasized situation.

6. The absorber system according to claim 5, wherein the extension-compression gain changer is configured to change the extension-compression gain such that the damping force to be generated by the damping force generator is less when the driving-stability-emphasized situation is not being established but the ride-comfort-emphasized situation is being established than when the driving-stability-emphasized situation is not being established and the ride-comfort-emphasized situation is not being established.

7. The absorber system according to claim 1, wherein the reference control amount determiner is configured to determine the reference control amount such that the damping force to be generated by the damping force generator increases with increase in a running velocity of the vehicle.

8. The absorber system according to claim 1,
wherein the damping force generator comprises a valve mechanism configured to allow working fluid flowing with the extension and compression of the cylinder to pass through the valve mechanism to provide resistance to the flow of the working fluid, and
wherein the damping force generator is configured to apply a force which depends on an electromagnetic force generated by the solenoid, to the valve mechanism to change a valve opening pressure of the valve mechanism to change the damping force according to the current supplied to the solenoid.

9. The absorber system according to claim 1,
wherein the extension-compression gain changer is configured to, when a steering speed is greater than a set speed, determine that the vehicle is in the driving-stability-emphasized situation and change the extension-compression gain, and
wherein the extension-compression gain changer is configured not to change the extension-compression gain when the steering speed is equal to or less than the set speed.

10. The absorber system according to claim 1,
wherein a skid suppressing system is mounted on the vehicle in which the absorber system is installed, and the skid suppressing system is configured to suppress a skid in turning of the vehicle to maintain stability of the vehicle,
wherein the extension-compression gain changer is configured to, when the skid is being suppressed by the skid suppressing system, determine that the vehicle is in the driving-stability-emphasized situation and change the extension-compression gain, and
wherein the extension-compression gain changer is configured not to change the extension-compression gain when the skid is not being suppressed by the skid suppressing system.

11. The absorber system according to claim 1,
wherein the extension-compression gain changer is configured to, when a running velocity of the vehicle is greater than a set velocity, determine that the vehicle is in the driving-stability-emphasized situation and change the extension-compression gain, and
wherein the extension-compression gain changer is configured not to change the extension-compression gain when the running velocity of the vehicle is equal to or less than the set velocity.

12. The absorber system according to claim 1,
wherein the extension-compression gain changer is configured to, when strength of vibration of the sprung portion is greater than set strength, determine that the vehicle is in the ride-comfort-emphasized situation and change the extension-compression gain, and
wherein the extension-compression gain changer is configured not to change the extension-compression gain when the strength of vibration of the sprung portion is equal to or less than the set strength.

13. The absorber system according to claim 1,
wherein the extension-compression gain changer is configured to, when a running velocity of the vehicle is less than a set velocity, determine that the vehicle is in the ride-comfort-emphasized situation and change the extension-compression gain, and
wherein the extension-compression gain changer is configured not to change the extension-compression gain when the running velocity of the vehicle is equal to or greater than the set velocity.

* * * * *